May 1, 1928.                      1,668,366
L. HARTWAGNER
COMPENSATED ASYNCHRONOUS MACHINE
Filed Aug. 9, 1923
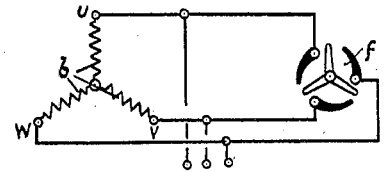
Fig. 1.
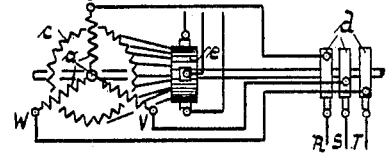
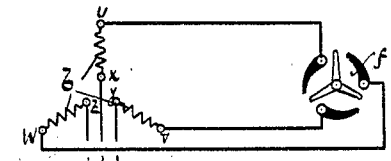
Fig. 2.
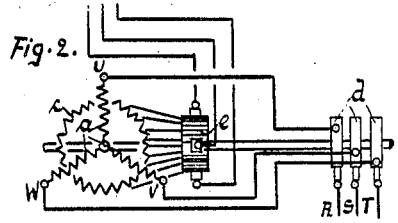
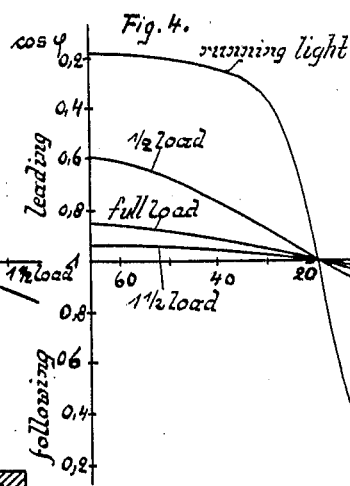
Fig. 3.      Fig. 4.
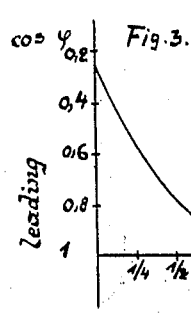
Fig. 5
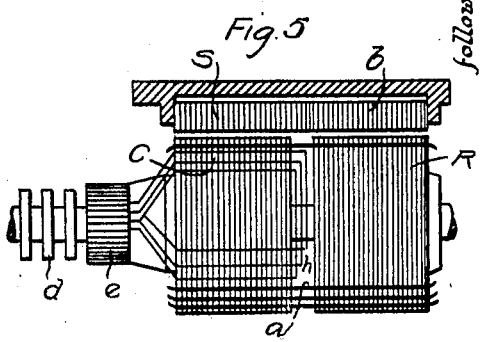
Inventor
Ludwig Hartwagner.
By Serrell Son
His Attorneys.

Patented May 1, 1928.

1,668,366

UNITED STATES PATENT OFFICE.

LUDWIG HARTWAGNER, OF DRESDEN, GERMANY, ASSIGNOR TO SACHSENWERK, LICHT-UND KRAFT-AKTIENGESELLSCHAFT, OF NIEDERSEDLITZ, NEAR DRESDEN, GERMANY.

COMPENSATED ASYNCHRONOUS MACHINE.

Application filed August 9, 1923, Serial No. 656,550, and in Germany April 20, 1923.

The object of the invention is the compensation or, if so desired, the overcompensation of the phase-displacement of the line-current in an asynchronous machine. This is accomplished by a compensating winding, wound as a continuous-current armature winding, located on the primary member and inductively linked with the primary winding (exciting-winding), and by various other means as hereinafter set forth.

In the drawing Figure 1 is a diagrammatic plan illustrating one form of the invention, Fig. 2 is a similar view illustrating another form of the invention, Figs. 3 and 4 are curves illustrating the advantages of the use of an apparatus made in accordance with this invention, and Figure 5 is a diagrammatic section illustrating a manner in which the compensating winding may be made to extend only across part of the axial length of the core of the primary member.

As an example such a compensation arrangement is represented in Fig. 1 with respect to a three-phase current motor. Preferably the primary winding "$a$" is placed on the rotor and the secondary winding "$b$" on the stator of the machine. In this case the rotor also carries the compensating winding "$c$" which is usually placed in the same slots as the primary winding. The turns of the compensating winding are connected to the segments of a commutator "$e$" with a single set of three brushes bearing on it. The brushes are attached to the stator and staggered at an angle of 120 electrical degrees. With the aid of the commutator and its brushes the compensating winding is connected in series to the secondary winding.

These principles are applicable to asynchronous motors and generators as well as to any single-phase or polyphase system.

The arrangement may kinematically be reversed. The primary winding and the compensating winding would then be located on the stator which would also carry the commutator segments whereas the rotor would receive the secondary winding and carry brushes bearing on said commutator.

The operation of machines designed in accordance with the principles of this invention is as follows:—

If the primary winding is connected to the line-voltage a practically constant voltage of line-frequency is produced in the compensating winding due to the rotating flux which is practically constant at all loads. The line-frequency of this voltage is transformed into slip-frequency (frequency of the voltage induced in the secondary winding or, in short, slip-voltage) by means of the commutator and its brushes, so that the compensation-voltage can directly be switched in series with the slip-voltage. Therefore, both working currents and magnetizing currents are exclusively circulated through the secondary winding, the brushes, the commutator, and the compensating-winding.

Any compensation-voltage will exert its maximum phase-correcting effect when its vector is at right angles to the vector of the slip-voltage. Ninety degrees ahead or back of this optimum position, or, in other words, when the direction of the compensation-voltage coincides with the direction of the slip-voltage no phase-correcting effect whatever will be brought about (neutral brush position). If, for instance, the magnitude of the compensation-voltage in its optimum phase-position be so adjusted as to fully compensate the primary current at full load the behavior or the compensation characteristic of the machine at other but full loads is represented by the curve in Fig. 3. As shown in this figure the motor is highly overcompensated at light or small partial loads, and insufficiently compensated at overloads. In many cases this high overcompensation is not desirable.

Therefore, in such cases a considerably higher voltage (about doubly as high) is applied than would be necessary for full compensation at full load. If for this condition the power-factor curves for various loads are plotted as a function of the brush-shift characteristics as represented in Figure 4 will result. From these curves it will be noted that there is a definite brush position where power-factor unity is maintained at all loads, the curves showing the behavior for loads ranging from light load to fifty per cent overload. This means that under these circumstances the optimum brush position is no more ninety degrees referred to the neutral position, but at an angle much smaller than that (about 20 to 30 electrical degrees).

For a given compensation characteristic the position of the brushes is definite and therefore stationary. Their position is usually secured by a set screw. The machine can also be so constructed as to allow of a change of its compensation characteristic within certain limits determined by its special design, for instance a certain overcompensation instead of full compensation. This can be accomplished by providing a brush-holder which can be set in various positions each of which corresponds to another phase-compensation characteristic.

This provision of a number of positions for the brushes is something entirely different from the brush-shift as employed for speed-control in AC-commutator motors as heretofore employed. In the latter case the brush-shift is the means for adapting the motor to the given conditions in the shop. If, however, in this invention the possibility of a change of the brush-position is considered it will usually be in anticipation of changing conditions in the shop. For instance, it may be that other ordinary induction motors are added to the plant which could be compensated then by overcompensating a motor of this invention which before that addition was merely compensated. Or, for instance, it may become more profitable to overcompensate a motor instead of only compensating it in connection with a change of the power-factor rates of the public utility furnishing the current for the motor.

The voltage produced in the compensating winding is very small. Usually one or two turns for each bar will suffice for a complete compensation. In order to keep the voltage at the required low value it may be necessary with larger motors to switch several turns in parallel. If this measure should not be sufficient the winding may be so arranged as to cover only part of the slots, for instance every second slot only, or the slot pitch of the winding may be shortened. Under certain conditions the axial length of the conductors may be reduced by putting the peripheral part of the turns into one of the ventilating ducts *h* thus cutting the winding only by part of the rotating flux, as illustrated in Figure 5 in which R represents the rotor, S represents the stator, and in which the windings and other parts are indicated by the same reference letters as the corresponding parts in the other figures of the drawing. In conformity with the low pressure required and the small number of turns also the number of segments and the overall dimensions of the commutator are small. The commutation does not cause any trouble even at considerable overloads of the machine. Both the secondary winding and the compensating winding can be placed in their slots on the secondary and primary member respectively, and the manufacture of these members, with the exception of the primary phase winding, can be completed irrespective of the pressure that the primary winding will be ordered for, thus facilitating mass production. The commutator may be mounted in any suitable manner, preferably between the slip-rings and the rotor core.

For starting the compensated motor an ordinary starting resistance is used. (See Fig. 1). During the starting the switch "*g*" is open so that the secondary winding is only closed upon the starting resistances. After the starting has been completed the starting resistances are cut out and the secondary winding is switched in series with the compensating winding by closing the switch "*g*". It would also be permissible, following the starting procedure, to first close the switch "*g*" and then disconnect the starting resistances thereby avoiding any interruption of the circuits. In this case the compensating winding will be short-circuited but for a very short period.

A perfectly satisfactory starting method is obtained by having connected in series all the time, that is for the starting as well as for the normal operation, the compensating winding, the starting resistances, and the secondary winding. In this case no opening or short-circuiting of the circuits will occur. If the secondary winding is a three-phase winding an ordinary three-phase starter can be employed if its star-point be opened and its resistances connected in series between the compensating winding and the secondary winding.

Without modifying the fundamental principle of this wiring diagram an arrangement as shown in Fig. 2 is usually preferred. In this case the secondary winding has six leads coming out and is switched in series between the compensating winding and the starting resistances, so that a normal starter-box usually with star-connection of its resistances can be employed.

What I claim is:

1. In an asynchronous machine and in combination, a primary member having a primary winding, a compensating winding, means for supplying current to the primary winding, a commutator for the compensating winding, a secondary member having a secondary phase-winding, and means comprising a single set of brushes for connecting said secondary winding in series with the compensating winding.

2. In an asynchronous machine and in combination, a primary member having a primary winding, a compensating winding, means for supplying current to the primary winding, a commutator for the compensating winding, a secondary member having a secondary phase-winding, and means comprising a single set of brushes relatively stationary to the secondary member for connecting said secondary winding in series with the compensating winding.

3. In an asynchronous machine and in combination, a primary member having a primary winding, a compensating winding, means for supplying current to the primary winding, a commutator for the compensating winding, a secondary member having a secondary phase-winding, a starter, and means comprising a single set of brushes for connecting said secondary winding to both the compensating winding and the starter in series.

4. In an asynchronous machine and in combination, a primary member having a primary winding, a compensating winding, means for supplying current to the primary winding, a commutator for the compensating winding, a secondary member having a secondary open phase-winding, means comprising a single set of brushes, and a starter, the corresponding ends of said secondary winding being connected to the brushes and the other ends thereof being connected to the terminals of the starter for connecting said secondary winding in series to said compensating winding and to the starter.

5. In an asynchronous machine and in combination, a primary member having a primary winding and a compensating winding the voltage of which is substantially twice the voltage used for full-load working with unity power-factor, means for supplying current to the primary winding, a commutator for the compensating winding, a secondary member having a secondary phase-winding, and means comprising a single set of brushes for connecting said secondary winding in series to the compensating winding.

6. In an asynchronous machine and in combination, a primary member having a primary winding, a compensating winding which latter extends only across part of the axial length of the active core of the primary member, means for supplying current to the primary winding, a commutator for the compensating winding, a secondary member having a secondary phase-winding, and means comprising a single set of brushes for connecting said secondary winding in series to the compensating winding.

7. In an asynchronous machine and in combination, a rotor having a primary winding and a compensating winding, slip rings for supplying current to the primary winding, a commutator for the compensating winding, a stator having a polyphase secondary star winding, and means comprising a single set of brushes for connecting said secondary winding in series with the compensating winding.

8. In an asynchronous machine and in combination, a rotor having a primary winding and a compensating winding, slip rings for supplying current to the primary winding, a commutator for the compensating winding, a stator having a polyphase secondary star winding, and means comprising a single set of brushes relatively stationary to the stator for connecting the said secondary winding in series with the compensating winding.

9. In an asynchronous machine and in combination, a rotor having a primary winding and a compensating winding, slip rings for supplying current to the primary winding, a commutator for the compensating winding, a stator having a polyphase secondary star winding, a starter, and means comprising a single set of brushes for connecting said secondary winding in series with the compensating winding.

10. In an asynchronous machine and in combination, a rotor having a primary winding and a compensating winding, slip rings for supplying current to the primary winding, a commutator for the compensating winding, a stator having a polyphase secondary star winding, a starter, and means comprising a single set of brushes for connecting said secondary winding to both the compensating winding and the starter in series.

11. In an asynchronous machine and in combination, a rotor having a primary winding and a compensating winding, slip rings for supplying current to the primary winding, a commutator for the compensating winding, a stator having a polyphase secondary star winding, a single set of brushes, and a starter, the corresponding ends of the said stator winding being connected to the brushes and the other ends thereof being connected to the terminals of the starter for connecting the said secondary winding in series with the said compensating winding and the starter.

12. In an asynchronous machine and in combination, a rotor having a primary winding and a compensating winding, the voltage of which is substantially twice the voltage used for full-load working with a unitary power-factor, slip rings for supplying current to the primary winding, a commutator for the compensating winding, a stator having a polyphase secondary star winding, a single set of brushes, and means for connecting the said secondary winding in series with the said compensating winding.

13. In an asynchronous machine and in combination, a rotor having a primary winding and a compensating winding which latter extends only over a part of the axial length of the active rotor-iron, slip rings for supplying current to the primary winding, a commutator for the compensating winding, a stator having a polyphase secondary star winding, a single set of brushes, and means for connecting the said secondary winding in series with the said compensating winding.

LUDWIG HARTWAGNER.